*A. M. Newland,*
*Barrow & Turnip Drill.*
No. 109,041. Patented Nov. 8, 1870.
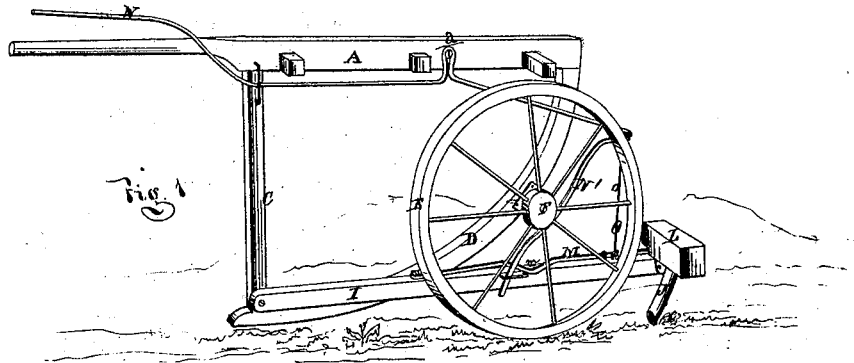
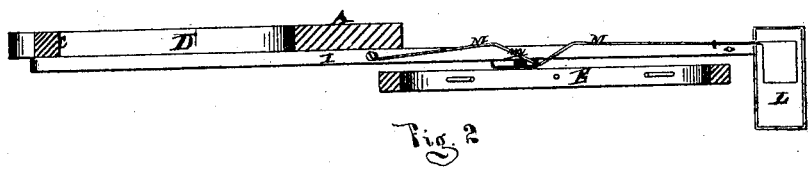
ATTEST
M. Stewart
Frederick Eberts
INVENTOR
A. M. Newland
per Atty
Thos. S. Sprague

United States Patent Office.

ALBERT M. NEWLAND, OF OLIVET, MICHIGAN.

Letters Patent No. 109,041, dated November 8, 1870.

IMPROVEMENT IN COMBINED BARROWS AND TURNIP-DRILLS.

The Schedule referred to in these Letters Patent and making part of the same.

*To whom it may concern:*

Be it known that I, ALBERT M. NEWLAND, of Olivet, in the county of Eaton and State of Michigan, have invented a new and useful Improvement in the Combined Cart, Wheelbarrow, and Turnip-Drill, patented by me July 5, 1870; and I do declare that the following is a true and accurate description thereof, reference being had to the accompanying drawing and to the letters of reference marked thereon and being a part of this specification, in which—

Figure 1 is a perspective view of one of the side frames of the implement, showing my device attached to the inner side thereof.

Figure 2 is a sectional plan of the same.

Like letters indicate like parts in each figure.

The nature of this invention relates to an improvement in the construction of the combined cart, wheelbarrow, and turnip-drill for which Letters Patent were issued to me bearing date July 5, 1870, and numbered 104,983; and It consists in the addition thereto of a pair of hand-levers, so arranged that, when desired, the bars carrying the shoes may be elevated from the ground and the seed-dropping devices caused to cease their operation, as more fully hereinafter set forth.

In the drawing—

A represents one of the side bars.

D, its curved brace.

E, the wheel rotating upon its axle F, secured to the curved brace, as described in said Letters Patent.

I is one of the bars, pivoted at its rear end to the leg or standard C, and carrying at its front end the hopper L and spout or shoe J, from and through which the seed is delivered by the action of the spring-lever M, as described in said Letters Patent, by the spokes of the wheel striking the inward-projecting curve *m* in said lever.

In that device no provision was made to stop the discharge of the seed, nor to elevate the shoes J when desired, as in turning or going from field to field.

To overcome these difficulties I construct a pair of levers, N, in the form shown in fig. 1, one of which I pivot to the inner side of the side bars A at *a*.

The rear ends of these levers extend along and a little above the handles of the implement.

The forward end of each lever is bent into a bell-crank, N', extending at its lower end along the inner face of the bar I, just behind the curve or cam *m* in the spring-lever M, and moves in a keeper or slotted guide, *n*, so that, by depressing the handles of the lever N, its bell-crank will be thrown forward, and press the curve *m* in the spring-lever away from the spokes of the wheel, when it will cease to operate the former.

The bar I is suspended from the forward extremity of the lever N by a link or chain, O, so that, when the seed-dropping mechanism is thrown out of gear and ceases to operate, the shoe J will be lifted clear of the ground, and the implement moved about without operating the seed-dropping mechanism or furrowing the ground.

Having thus described my improvement,

What I claim as new, and desire to secure by Letters Patent, is—

The construction and arrangement of the hand-levers N, bell-cranks N', and links O, with relation to the side bars A and shoe-bars I, as and for the purpose herein shown and set forth.

ALBERT M. NEWLAND.

Witnesses:
 FREDERICK EBERTS,
 M. STEWART.